US012572000B2

(12) United States Patent
Sun et al.

(10) Patent No.: US 12,572,000 B2
(45) Date of Patent: Mar. 10, 2026

(54) OPTICAL SYSTEM AND HEAD MOUNTED DISPLAY

(71) Applicant: GOERTEK OPTICAL TECHNOLOGY CO., LTD, Shandong (CN)

(72) Inventors: Qi Sun, Shandong (CN); Bogang Zhao, Shandong (CN)

(73) Assignee: GOERTEK OPTICAL TECHNOLOGY CO., LTD, Shandong (CN)

( * ) Notice: Subject to any disclaimer, the term of this patent is extended or adjusted under 35 U.S.C. 154(b) by 377 days.

(21) Appl. No.: 18/247,107

(22) PCT Filed: Dec. 21, 2021

(86) PCT No.: PCT/CN2021/140041
§ 371 (c)(1),
(2) Date: Mar. 29, 2023

(87) PCT Pub. No.: WO2023/097814
PCT Pub. Date: Jun. 8, 2023

(65) Prior Publication Data
US 2024/0361580 A1      Oct. 31, 2024

(30) Foreign Application Priority Data
Nov. 30, 2021    (CN) .......................... 202111450383.9

(51) Int. Cl.
*G02B 13/18* (2006.01)
*G02B 13/00* (2006.01)

(52) U.S. Cl.
CPC ......... *G02B 13/18* (2013.01); *G02B 13/0035* (2013.01)

(58) Field of Classification Search
CPC ............................ G02B 13/18; G02B 13/0035
See application file for complete search history.

(56) References Cited

U.S. PATENT DOCUMENTS

| | | |
|---|---|---|
| 2007/0091473 A1 | 4/2007 | Shimizu |
| 2017/0248769 A1 | 8/2017 | Stamenov |
| 2021/0173179 A1 | 6/2021 | Leu |
| 2021/0325634 A1 | 10/2021 | Katsuda et al. |
| 2021/0333523 A1 | 10/2021 | Ishioka et al. |

FOREIGN PATENT DOCUMENTS

| | | |
|---|---|---|
| CN | 104536129 A | 4/2015 |
| CN | 205176383 U | 4/2016 |
| CN | 105589208 A | 5/2016 |

(Continued)

OTHER PUBLICATIONS

TW I413795, translation (Year: 2013).*

*Primary Examiner* — Wen Huang
(74) *Attorney, Agent, or Firm* — Ingrassia Fisher & Lorenz, LLP

(57)      ABSTRACT

An optical system and a head mounted display are disclosed. The optical system comprises: a third lens, a second lens and a first lens glued successively along a propagation direction of incident light. Two glued surfaces of the first lens and the second lens are both Fresnel surfaces. The present disclosure provides a solution of short-focus, high light efficiency, high-resolution, direct transmission optical structure, in which the design of gluing three optical lenses also facilitates reducing stray light.

16 Claims, 13 Drawing Sheets

(56)  References Cited

FOREIGN PATENT DOCUMENTS

| | | | |
|---|---|---|---|
| CN | 106338820 A | 1/2017 | |
| CN | 106338831 A | 1/2017 | |
| CN | 106405817 A | 2/2017 | |
| CN | 206115031 U | 4/2017 | |
| CN | 107632404 A | 1/2018 | |
| CN | 108474935 A | 8/2018 | |
| CN | 208506366 U | 2/2019 | |
| CN | 109416469 A | 3/2019 | |
| CN | 109507801 A | 3/2019 | |
| CN | 110286473 A | 9/2019 | |
| CN | 110727101 A | 1/2020 | |
| CN | 112630973 A | 4/2021 | |
| CN | 108604007 B | 6/2021 | |
| CN | 213934401 U | 8/2021 | |
| CN | 213934403 U | 8/2021 | |
| JP | H08110492 A | 4/1996 | |
| JP | 2001215411 A | 8/2010 | |
| JP | 2019057367 A | 4/2019 | |
| JP | 2020020935 A | 2/2020 | |
| JP | 2007212847 A | 8/2023 | |
| TW | I413795 B | * 11/2013 | ......... G02B 27/0037 |
| WO | 2020045517 A1 | 3/2020 | |

* cited by examiner

Fig,11

OPTICAL SYSTEM AND HEAD MOUNTED DISPLAY

CROSS-REFERENCE TO RELATED APPLICATIONS

This Application is a U.S. National-Stage entry under 35 U.S.C. § 371 based on International Application No. PCT/CN2021/140041, filed Dec. 21, 2021 which was published under PCT Article 21(2) and which claims priority to Chinese Application No. 202111450383.9, filed Nov. 30, 2021, which are all hereby incorporated herein in their entirety by reference.

TECHNICAL FIELD

This application pertains to the technical field of optical imaging, more specifically, to an optical system and a head mounted display.

BACKGROUND

In recent years, augmented reality (AR) technology and virtual reality (VR) technology have been applied in intelligent wearable devices and developed rapidly. The core component of both the augmented reality technology and the virtual reality technology is the display optical system. The display effect of the display optical system will directly determine the quality of intelligent wearable devices.

In the prior art, take VR devices as an example, most conventional VR devices use a display optical system obtained by combining a one-piece lens with a display screen. However, due to the optical path imaging requirements, the lens will be far away from the display screen, which leads to the large size of the VR device and is not conducive to the miniaturization of the product, and may lead to poor use experience when the user wears the VR device. In addition, there are also conventional VR devices adapting a solution of folded optical path. Although this solution can realize the miniaturization and lightweight of VR devices, it has the problems of high production cost, low light efficiency (<25%) and ghosting. In addition, other objects, desirable features and characteristics will become apparent from the subsequent summary and detailed description, and the appended claims, taken in conjunction with the accompanying drawings and this background.

SUMMARY

The object of the present disclosure is to provide a new technical solution of an optical system and a head mounted display.

According to an aspect of the present disclosure, an optical system is provided. The optical system comprises:

a third lens, a second lens and a first lens glued successively along a propagation direction of incident light;

wherein two glued surfaces of the first lens and the second lens are both Fresnel surfaces.

Optionally, the first lens and the second lens both have positive focal powers, and the third lens has a negative focal power.

Optionally, an effective focal length f1 of the first lens and an effective focal length f of the optical system satisfy $1.5 < f1/f < 2.22$;

an effective focal length f2 of the second lens and the effective focal length f of the optical system satisfy $1.5 < f2/f < 2.22$; and an effective focal length f3 of the third lens (3) and the effective focal length f of the optical system meet $-9 < f3/f < -5$.

Optionally, the effective focal length f1 of the first lens is $30 \text{ mm} \le f1 \le 40 \text{ mm}$; the effective focal length f2 of the second lens is $30 \text{ mm} \le f2 \le 40 \text{ mm}$;

the effective focal length f3 of the third lens is $-180 \text{ mm} \le f3 \le -100 \text{ mm}$; and the first lens, the second lens and the third lens are located on a same optical axis.

Optionally, the effective focal length f of the optical system is $18 \text{ mm} \le f \le 20 \text{ mm}$.

Optionally, the two glued Fresnel surfaces are glued and connected by means of edge gluing in edge areas.

Optionally, the two glued surfaces of the second lens and the third lens are both aspherical surfaces.

Optionally, the two glued aspherical surfaces are glued and connected in either of the following ways:

the two aspherical surfaces are glued and connected by means of edge gluing in edge areas;

the two aspherical surfaces are glued and connected by means of surface gluing.

Optionally, a light-transmitting optical glue is applied between the first lens and the second lens, and between the second lens and the third lens respectively to glue them together, and a refractive index of the optical glue is 1.1 to 1.3.

According to another aspect of the present disclosure, a head mounted display is provided. The head mounted display comprises an optical system as described above.

The beneficial effects of the present disclosure are as follows.

The embodiments of the present disclosure propose a design of direct transmission optical path structure, which meets the optical requirements of short-focus, high light efficiency and high resolution by gluing three optical lenses in combination with the surface shape optimization of the optical lenses. The optical system obtained can be applied to, for example, head mounted displays (such as VR devices).

By the following detailed description of the exemplary embodiments of the present disclosure with reference to the accompanying drawings, other features and advantages of the present disclosure will become clear.

BRIEF DESCRIPTION OF DRAWINGS

The present invention will hereinafter be described in conjunction with the following drawing figures, wherein like numerals denote like elements, and.

Figure 1:
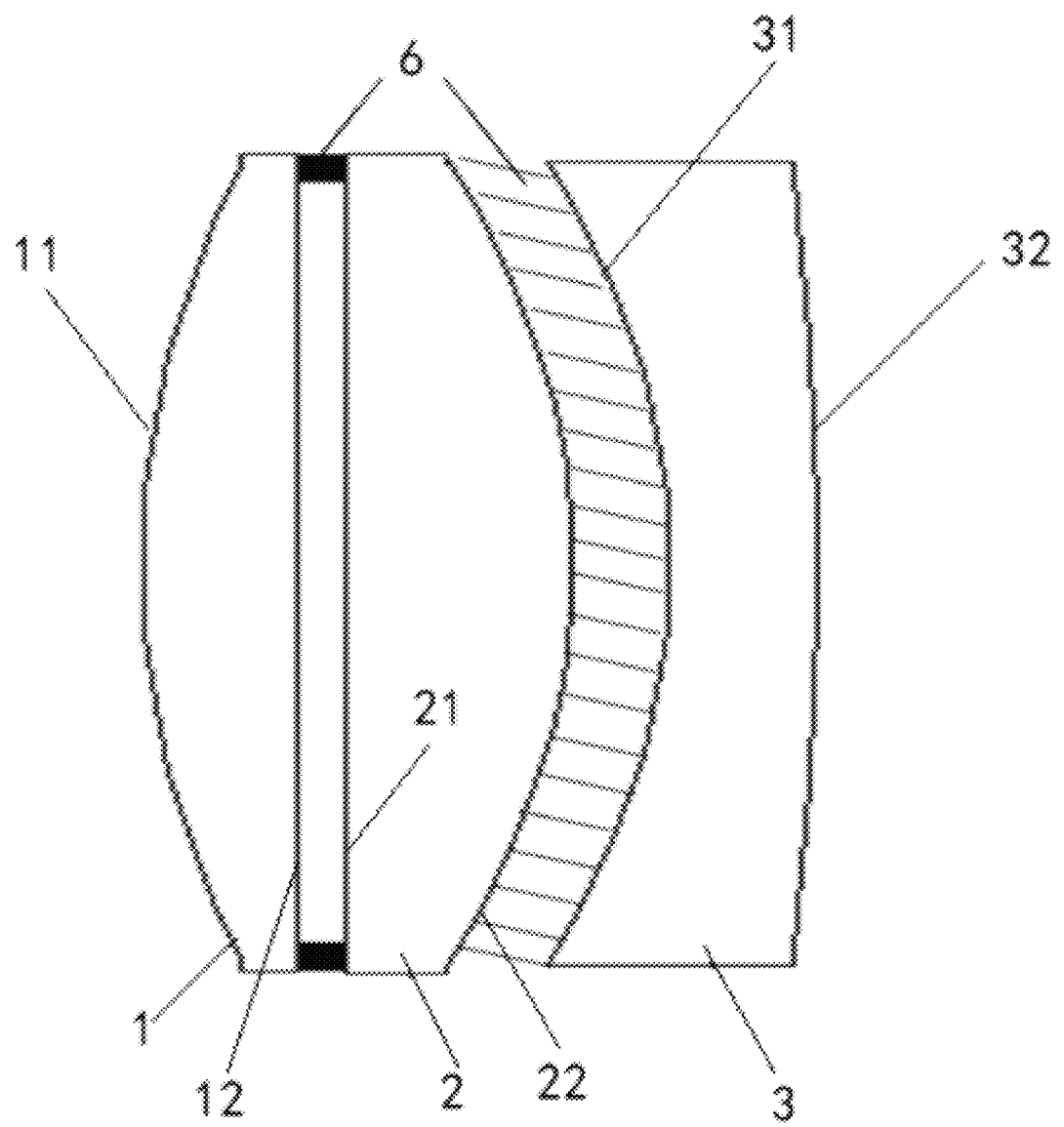
FIG. 1 is a schematic diagram of the structure of an optical system according to an embodiment of the present disclosure.

In the drawings: 1. first lens; 2. second lens; 3. third lens; 4. display screen; 5. human eye; 6. optical glue; 11. first surface; 12. second surface; 21. third surface; 22. fourth surface; 31. fifth surface; 32. sixth surface.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in embodiments of the present disclosure will be described clearly and completely below with reference to the drawings in the embodiments of the present disclosure. Obviously, the embodiments as described below are merely part of, rather than all, embodiments of the present disclosure. Based on the embodiments of the present disclosure, any other embodiment obtained by a person of ordinary skill in the art without paying any creative effort shall fall within the protection scope of the present disclosure.

The following description of at least one exemplary embodiment is in fact only illustrative, and in no way serves as any restriction on the present disclosure and its application or use.

The techniques, methods and equipment known to a person of ordinary skill in the art may not be discussed in detail, but in appropriate cases, these techniques, methods and equipment shall be considered as a part of the specification.

In all the examples shown and discussed herein, any specific value should be interpreted as merely illustrative and not as a limitation. Therefore, other examples of the exemplary embodiments may have different values.

It should be noted that similar reference numerals and letters denote similar items in the following drawings. Therefore, once an item is defined in one drawing, it does not need to be further discussed in the subsequent drawings.

The optical systems and the head mounted displays according to embodiments of the present disclosure will be described in detail below with reference to FIGS. 1 to 13.

According to an aspect of the present disclosure, an optical system is provided. The optical system is a short-focus, high light efficiency, high-resolution, direct transmission optical system, which is suitable for application in electronic devices, for example, head mounted displays (HMD) such as VR devices (such as VR glasses or VR helmets). It has a good application prospect.

The optical system according to an embodiment of the present disclosure, as shown in FIGS. 1, 2, 6 and 10, comprises a third lens 3, a second lens 2 and a first lens 1 arranged successively along the propagation direction of the incident light. Two glued surfaces of the first lens and the second lens are both Fresnel surfaces.

The optical system according to the embodiment of the present disclosure is designed as a direct transmission optical path structure. The design of optical path structure is relatively simple and thus is easy to make.

Figure 2:
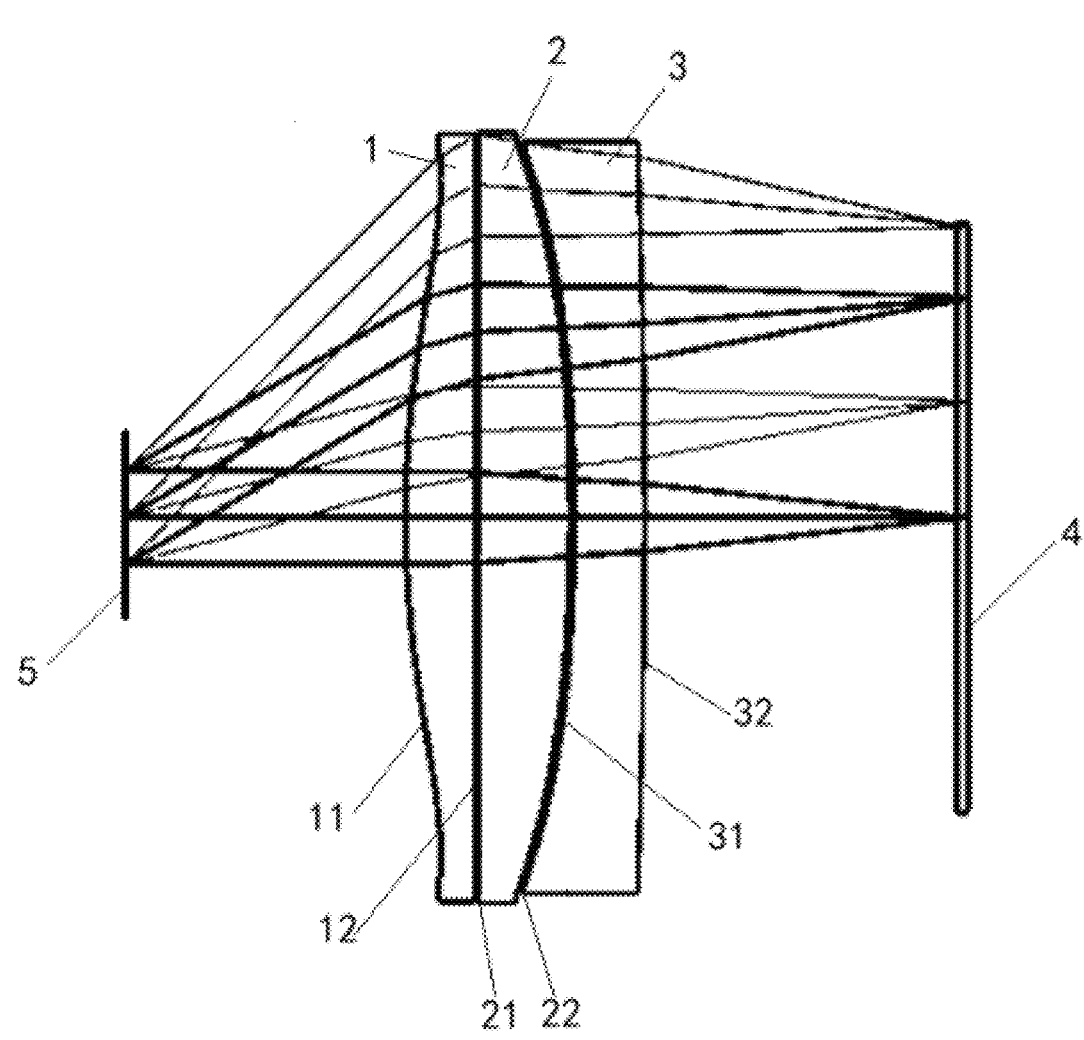
FIG. 2 is a schematic diagram of the imaging principle of an optical system according to a first embodiment of the present disclosure.
Figure 6:
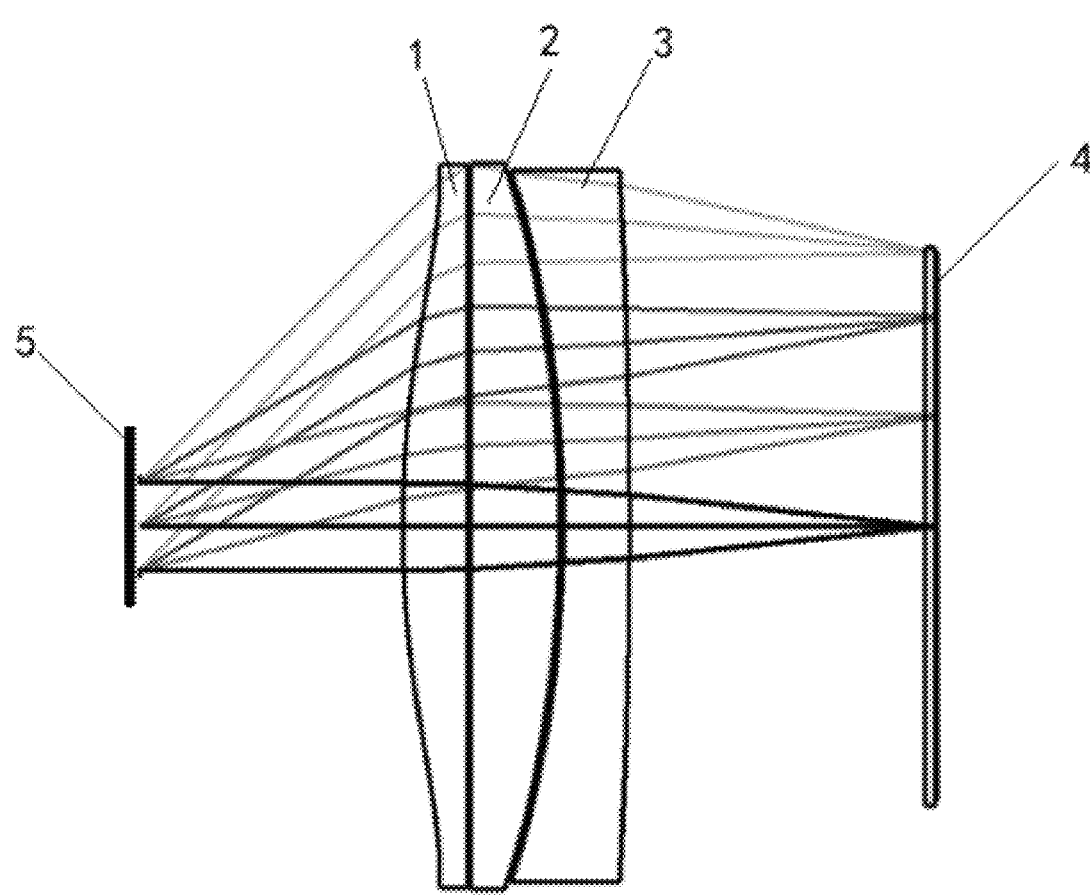
FIG. 6 is a schematic diagram of the imaging principle of an optical system according to a second embodiment of the present disclosure.
Figure 10:
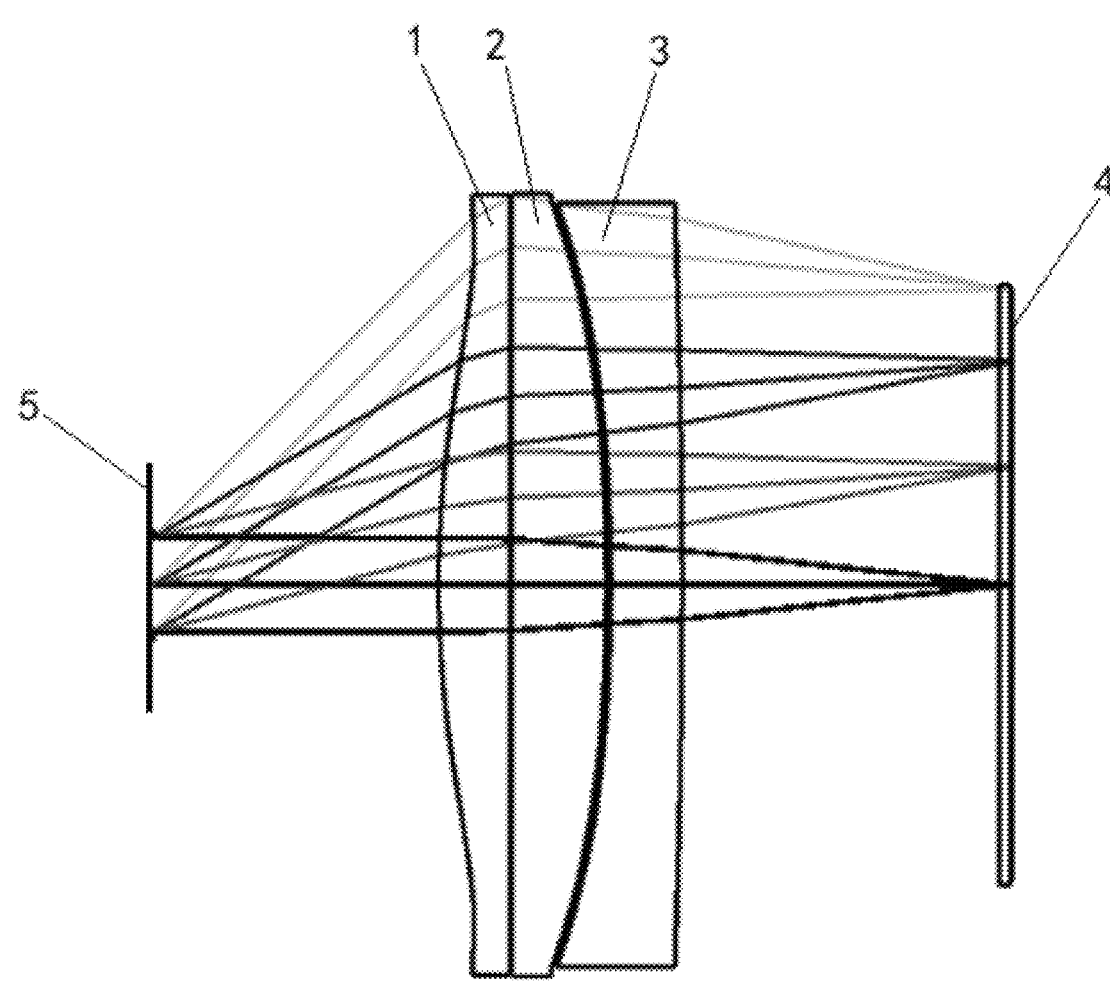
FIG. 10 is a schematic diagram of the imaging principle of an optical system according to a third embodiment of the present disclosure.

The optical system may also comprise a display screen 4, as shown in FIGS. 2, 6 and 10. In the optical path structure, the display screen 4 can be used to emit light, i.e., the incident light as stated above.

That is to say, in the optical system according to the embodiment of the present disclosure, a lens combination is designed, which comprises, for example, three glued optical lenses, as shown in FIGS. 1, 2, 6 and 10. The lens combination can be used to project the incident light (for example, emitted from the display screen 4) into the human eye 5 for imaging.

The optical system according to an embodiment of the present disclosure is based on the design of gluing three optical lenses, namely, the first lens 1, the second lens 2 and the third lens 3 in the optical system are glued together, which can meet the design requirements of optical structure with ultra-short-focus, high light efficiency and high resolution. Moreover, based on the gluing of the three optical lenses in combination with the surface shape optimization of each lens, it also facilitates improving the imaging quality.

Further, in the optical system according to the embodiment of the present disclosure, the imaging spot size is less than 50 μm in 15° field of view, and less than 88 μm in full field of view.

The design of gluing the three lenses can also reduce the stray light of the optical system.

Moreover, the glued lens combination formed after gluing can be used as one optical component, which reduces the difficulty of assembly of optical components, reduces the risk of generating impurities between lenses during the assembly, and thus can improve the yield.

In sum, the solution according to the embodiment of the present disclosure overcomes the problems caused by the conventional combination solution of one-piece lens plus display screen, i.e., the lens is far away from the display screen, which leads to the larger size of the VR device and is not conducive to the miniaturization of the product; moreover, the light efficiency is low. At the same time, it can also overcome the defects caused by using folded optical path, and has relatively low processing difficulty and production cost; the direct transmission optical structure is also simpler than the folded optical path.

For example, as shown in FIGS. 1 and 2, the optical system is provided with a display screen 4. The display screen 4 is, for example, a 1.4 inch display which realizes a 100 degree field of view. On this basis, the conventional one-piece lens (1P) structure or two-piece lens (2P) structure is not enough to distinguish this type of display screen. The reason is as follows.

The one-piece lens (1P) structure only has two surfaces for optimization of surface freedom, its convergence ability is limited, and the aberration or chromatic aberration cannot be corrected. The pixel size (i.e., spot size) that can be distinguished in the full field of view is about 80 μm to 100 μm. More importantly, it cannot realize short-focus.

The two-piece lens (2P) structure increases the surface freedom of lens surface for optimization and can realize short-focus, but it still has the limitation of resolution and cannot meet the requirements of better imaging quality.

In the solution of the embodiment of the present disclosure, three glued optical lenses are used, which can not only achieve the goal of short total optical length, but also reduce the generation of stray light (for example, reduce the number of diffuse reflections and radiation area of light in the air spacing, and thus reduce the stray light caused).

The solution of the present disclosure provides a short-focus optical path structure, in which two glued Fresnel surfaces are used, which provides a large focal power. In consideration of the influence of chromatic aberration, the third lens 3 is also used to eliminate chromatic aberration.

It should be noted that in the solution according to the embodiment of the present disclosure, the Fresnel surfaces of the first lens 1 and the second lens 2 include but are not limited to a flat base.

That is to say, the Fresnel surfaces of the first lens 1 and the second lens 2 may also have a curved base. For another example, one of the Fresnel surfaces is a curved base, and the other is a flat base. The design of a curved base can make the lens lighter and thinner, thereby facilitating reducing the total weight of the optical system. Those skilled in the art can adjust the base type of the Fresnel surface according to the specific situation, and the present disclosure has no particular limitation herein.

In some examples of the present disclosure, as shown in FIGS. 1 and 2, the first lens 1 and the second lens 2 both have positive focal powers, and the third lens 3 has a negative focal power.

It can be understood that in the optical system according to the embodiment of the present disclosure, the first lens 1 and the second lens 2 are both designed as positive lenses, and the third lens 3 is designed as a negative lens; two positive lenses can provide a large focal power, while the participation of negative lenses can be used to eliminate chromatic aberration.

As shown in FIGS. 1, 2, 6 and 10, the two glued surfaces of the first lens 1 and the second lens 2 are Fresnel surfaces.

In other words, in the optical path structure, two Fresnel surfaces are arranged adjacent to each other, and these two Fresnel surfaces are glued together. This design can realize the low dispersion and short-focus of the optical path structure, and can also reduce stray light, which makes the optical system obtained have a high light efficiency.

In some examples of the present disclosure, as shown in FIG. 1, the first lens 1 comprises a first surface 11 and a second surface 12, and the second lens 2 comprises a third surface 21 and a fourth surface 22. In the entire optical system, the second surface 12 is glued to the third surface 21, and both are set as Fresnel surfaces. The first surface 11 and the fourth surface 22 are aspherical surfaces (further, both surfaces are convex surfaces).

Optionally, in the embodiment of the present disclosure, it is designed that the first surface 11 and the second surface 12 of the first lens 1 are respectively plated with an anti-reflection (AR) film.

After the two surfaces of the first lens 1 are respectively plated with an anti-reflection film, the reflected light can be reduced by the anti-reflection films, thereby increasing the transmissivity of light on the two surfaces of the first lens 1.

Optionally, the first surface 11 of the first lens 1 may be plated with a hardened film in addition to the anti-reflection film.

The reason is that the first surface 11 of the first lens 1 faces outward and needs to avoid scratches, collisions and other damages. The service life of the first lens 1 can be improved by plating the hardened film. The hardness, strength, etc. of the first surface 11 can be improved by plating the hardened film on the first surface 11 (i.e., hardening the first surface 11). This is beneficial to improve the service life of the entire optical system.

Of course, in the embodiment of the present disclosure, it is not limited to the first surface 11 of the first lens 1 that is plated with a hardened film, the second surface 12 of the first lens 1 may also be plated with a hardened film. Those skilled in the art can flexibly adjust according to specific needs, and the present disclosure has no particular limitation herein.

In addition, in the embodiment of the present disclosure, the first lens 1 may further have the following parameters.

In some examples of the present disclosure, the absolute value of the radius $R_1$ of the first surface 11 of the first lens 1 satisfies 40 mm≤Abs $(R_1)$≤50 mm; the absolute value of the radius $R_2$ of the second surface 12 of the first lens 1 satisfies 20 mm≤Abs $(R_2)$≤40 mm; the absolute value of the conic constant $K_1$ of the first surface 11 and the second surface 12 satisfies Abs $(K_1)$≤20.

The surface shape of the first surface 11 is different from that of the second surface 12. Specifically, the first surface 11 facing outward is designed as an aspherical surface (such as a convex surface), while the second surface 12 is designed as a Fresnel surface. When the first lens 1 formed by combining the Fresnel surface and the aspherical surface is used in the optical path structure, it facilitates realizing short-focus and high resolution.

In the embodiment of the present disclosure, after optimizing the surface shape of the first lens 1, if the processing difficulty and cost are considered, more preferably, the conic constant (i.e., $K_1$) of the first lens 1 is, for example, within [−10, 10], and the radius R of the Fresnel surface of the first lens 1 is greater than 23 mm.

In some examples of the present disclosure, as shown in FIG. 1, the second lens 2 comprises a third surface 21 and a fourth surface 22. The third surface 21 is designed as a Fresnel surface and the fourth surface 22 is designed as an aspherical surface (such as a convex surface).

Optionally, the third surface 21 and the fourth surface 22 are also plated with an anti-reflection film.

The reflection light is reduced by the anti-reflection films, thereby increasing the transmissivity of light on the two surfaces of the second lens 2.

In addition, in the embodiment of the present disclosure, the second lens 2 may further have the following parameters.

In some examples of the present disclosure, the absolute value of the radius $R_3$ of the second surface 21 of the second lens 2 satisfies 20 mm≤Abs $(R_3)$≤30 mm; the absolute value of the radius $R_4$ of the third surface 22 of the second lens 2 satisfies 50 mm≤Abs $(R_4)$≤90 mm; the absolute value of the conic constant $K_2$ of the third surface 21 and the fourth surface 22 satisfies Abs $(K_2)$≤20.

In the embodiment of the present disclosure, after optimizing the surface shape of the second lens 2, if the processing difficulty and cost are considered, more preferably, the conic constant (i.e., $K_2$) of the second lens 2 is, for example, within [−10, 10], and the radius R of the Fresnel surface of the second lens 2 is greater than 23 mm. This is substantially the same as the first lens 1.

It should be noted that the first lens 1 and the second lens 2 both have Fresnel surfaces. Considering the processing of lens surface shape, it is necessary to set the surface parameter within a certain range, otherwise the processing accuracy will be low or the cutter may break (this is because the tooth shape processing is difficult, and if the acute angle of the tooth shape is smaller, the processing angle and action will be more difficult). Because of this, it is preferable to set the conic constant K value within the range of [−10, 10], and the R value of the Fresnel surface of each lens is greater than 23 mm.

In the solution of the embodiment of the present disclosure, the two positive lenses, i.e., the first lens 1 and the second lens 2, both take the combination form of aspherical surface (such as convex surface)+Fresnel surface, and realize low dispersion and short-focus of the optical path structure based on the selection and cooperation of materials having different refractive indexes and Abbe numbers.

In some examples of the present disclosure, as shown in FIG. 1, the third lens 3 comprises a fifth surface 31 and a sixth surface 32. The fifth surface 31 is also glued with the fourth surface 22 of the second lens 2. The fifth surface 31 is an aspherical surface. In this way, the aspherical surface gluing is formed between the third lens 3 and the second lens 2.

For example, the third lens 3 has a negative focal power.

In the solution of the present disclosure, the third lens 3 is a negative lens which is thin at the center and thick at the edge and has the ability to diverge light. In the entire optical path structure, the third lens 3 can be used to eliminate chromatic aberration.

For example, the third lens 3 may be a biconcave lens (i.e., both surfaces are concave) or a plano-concave lens (i.e., one surface is concave and the other surface is flat).

More preferably, the fifth surface 31 is set as a concave surface, and the sixth surface 32 is set as a flat or concave surface. In this way, the concave surface of the third lens 3 can be well glued and connected with the convex surface of the second lens 2 to form aspherical surface gluing.

Optionally, the fifth surface 31 and the sixth surface 32 are both plated with an anti-reflection film.

After the two surfaces of the third lens 3 are respectively plated with an anti-reflection film, the reflection light can be reduced by the anti-reflection film to increase the transmissivity of light on the two surfaces of the third lens 3.

In addition, in the embodiment of the present disclosure, the third lens 3 may further have the following parameters.

In some examples of the present disclosure, the absolute value of the radius $R_6$ of the sixth surface 32 of the third lens 3 satisfies 200 mm≤Abs $(R_6)$≤500 mm.

The sixth surface 32 is arranged adjacent to the display screen 4.

In a specific example of the present disclosure, as shown in FIG. 1, the optical system comprises: the display screen 4, and the first lens 1, the second lens 2 and the third lens 3. The incident light emitted from the display screen 4 passes through the sixth surface 32 of the third lens 3 plated with an anti-reflection film, and enters the interior of the third lens 3. The light passing through the third lens 3 is diverged and enters the second lens 2. Two surfaces of the second lens 2 are also both plated with an anti-reflection film. In this way, the light is converged after passing through the second lens 2, and then enters the first lens 1. The first lens 1 is also a converging positive lens. After passing through the first lens 1, the light enters the human eye 5 for imaging. There is no optical path folding in the entire optical system, and the surface of each lens is plated with an anti-reflection film, so the light transmission efficiency is high.

In some examples of the present disclosure, an effective focal length $f_1$ of the first lens 1 and an effective focal length f of the optical system satisfy 1.5<$f_1$/f<2.22; an effective focal length $f_2$ of the second lens 2 and the effective focal length f of the optical system satisfy 1.5<$f_2$/f<2.22; an effective focal length $f_3$ of the third lens 3 and the effective focal length f of the optical system meet-9<$f_3$/f<−5.

The optical system according to an embodiment of the present disclosure is characterized by having a small effective focal length f.

In some examples of the present disclosure, the effective focal length $f_1$ of the first lens is 30 mm≤$f_1$≤40 mm; the effective focal length $f_2$ of the second lens is 30 mm≤$f_2$≤ 40 mm; the effective focal length $f_3$ of the third lens is −180 mm≤$f_3$≤−100 mm; the first lens 1, the second lens 2 and the third lens 2 are located on the same optical axis.

In some examples of the present disclosure, the effective focal length f of the optical system is 18 mm≤f≤20 mm.

Further, the effective focal length f of the optical system is 19.0 mm to 19.5 mm.

The effective focal length $f_1$ of the first lens 1 and the focal length $f_2$ of the second lens 2 are both greater than the effective focal length f of the lens group. The present disclosure provides a short-focus optical system. There is no optical path folding in the entire optical system. It is a direct transmission optical system that can achieve high-resolution imaging.

In the solutions according to the embodiments of the present disclosure, there are two methods for gluing different lenses:

(1) edge gluing: in this method, the glued lenses are closely attached by applying a glue only at the edge area of the lenses, and there is no glue in the effective diameter areas of the lenses;

(2) face gluing: in this method, the glued lenses are closely attached by coating an optical glue at both the edge areas and the effective diameter areas of the lenses.

In some examples of the present disclosure, the two glued Fresnel surfaces are glued and connected by means of edge gluing at the edge areas.

The first lens 1 and the second lens 2 both have a Fresnel surface. Considering the teeth-shaped structure of the base of the Fresnel surface, preferably, the edge areas of the two lenses are connected by gluing, so that the first lens 1 and the second lens 2 are closely attached together. The edge gluing is more reliable in gluing two Fresnel surfaces.

In some examples of the present disclosure, the two glued surfaces of the second lens 2 and the third lens 3 are both aspherical surfaces.

For example, the convex surface of the second lens 2 is glued with the concave surface of the third lens 3.

In some examples of the present disclosure, the two glued aspherical surfaces can be glued and connected in either of the following ways:

the two aspherical surfaces are glued and connected by means of edge gluing at the edge areas;

the two aspherical surfaces are glued and connected by means of surface gluing.

In the present disclosure, the third lens 3 and the second lens 2 are also glued together.

Specifically, the aspherical surface of the third lens 3 and the aspherical surface of the second lens 2 are connected by gluing. In other words, there is aspherical surface gluing between the two lenses. Both gluing methods can be used. However, when the optical glue is coated at both the edge areas and the effective diameter areas, the coverage area of the optical glue is wider, the gluing is firmer and more stable, but the yield of this method will be lower than that of the method of edge gluing. Those skilled in the art can flexibly select the method for gluing lenses according to specific needs.

In some examples of the present disclosure, a light-transmitting optical glue 6 is applied between the first lens 1 and the second lens 2, and between the second lens 2 and the third lens 3 to glue them together. The refractive index of the optical glue 6 is set to 1.1 to 1.3.

In order not to affect the propagation path or deflection route of the incident light, the optical glue used for gluing three lenses is preferably an optical glue having a low refractive index.

In the optical system according to the embodiment of the present disclosure, the second lens 2 is sandwiched between the first lens 1 and the third lens 3, and glued and connected with the first lens 1 and the third lens 3 to form a glued lens group. For the glued lens group obtained, the glued surfaces of the second lens 2 and the first lens 1 are both Fresnel surfaces, and the glued surfaces of the second lens 2 and the third lens 3 are aspherical surfaces, so there is no need to consider the problem of air gaps between the lenses, which not only helps to realize short-focus, but also better eliminates stray light.

In some examples of the present disclosure, the first lens 1 and the second lens 2 are made of the same material, and Table 1 lists the optical surface numbers (Surface) that are numbered sequentially from the human eye 5 (diaphragm) to the display screen 4, the curvature (C) of each optical surface on the optical axis, the distance (T) between each optical surface and the next optical surface on the optical axis from the human eye 5 (diaphragm) to the display screen 4, and even aspheric coefficients $\alpha_2$, $\alpha_3$, $\alpha_4$.

The aspheric coefficients can satisfy the following equation:

$$z = \frac{CY^2}{1 + \sqrt{1 - (1+k)C^2 Y^2}} + \sum_{i=2}^{N} \alpha_i Y^{2i} \tag{1}$$

In equation (1), z is a coordinate along the optical axis, Y is a radial coordinate in the unit of lens length, C is the curvature (1/R), and K is the conic constant, $\alpha_i$ is the coefficient of each high-order term, and 2i is the order of aspheric coefficient. In the solution of the present disclosure, considering the smoothness of the field curve, there is no high order spheric coefficients designed to be 4th order.

TABLE 1

| Surf | Type | Radius | Thickness | GLASS | Clear Diam | Mech Diam | Conic | 4th | 6th |
|---|---|---|---|---|---|---|---|---|---|
| OBJ | STANDARD | Infinity | −1500 | | 3000 | 3000 | 0 | | |
| STO | STANDARD | Infinity | 12 | | 4 | 4 | 0 | | |
| 2 | EVENASPH | 44.99955 | 3.152714 | K26R | 32.06139 | 33.25 | −1.979779 | −5.75E−07 | −4.60E−08 |
| 3 | FRESNELS | −25.99859 | 0.1 | OCA | 33.25 | 33.25 | −3.218091 | 1.86E−05 | −5.65E−08 |
| 4 | FRESNELS | 25.99851 | 4.645485 | K26R | 33.3437 | 33.3437 | −0.4090262 | 1.57E−05 | −1.07E−08 |
| 5 | EVENASPH | −69.64 | 0.1 | OCA | 32.90875 | 32.90875 | 1.507125 | 3.06E−07 | −2.91E−08 |
| 6 | EVENASPH | −69.64 | 2.999787 | OKP-1 | 32.65753 | 32.65753 | 1.507125 | 3.06E−07 | −2.91E−08 |
| 7 | EVENASPH | 499.9824 | 13.59927 | | 31.956 | 32.65753 | −9.555524 | −9.63E−06 | −8.54E−09 |
| 8 | STANDARD | Infinity | 0.45 | BK7 | 25.3329 | 25.34405 | 0 | | |
| 9 | STANDARD | Infinity | 0.0100276 | | 25.34405 | 25.34405 | 0 | | |
| IMA | STANDARD | Infinity | | | 25.14442 | 25.14442 | 0 | | | are both made of a COP material; the third lens 3 is made an OKP material or an EP material.

In the solution according to the embodiment of the present disclosure, for each lens (namely, the first lens 1, the second lens 2 and the third lens 3), in terms of selecting material, based on the consideration of short-focus and chromatic aberration, the combinations of materials having high refractive indexes and high/low Abbe numbers are selected for design optimization.

It should be noted that the first lens 1, the second lens 2 and the third lens 3 are not limited to the above materials, and other materials such as PMMA materials and glass materials can also be used.

In some examples of the present disclosure, the thickness $h_1$ at the center of the first lens 1 is 2 mm≤$h_1$≤4 mm; the thickness $h_2$ at the center of the second lens 2 is 3 mm≤$h_2$≤5 mm; the thickness $h_3$ at the center of the third lens 3 is 2 mm≤$h_3$≤4 mm.

The thickness of each lens will not be too thick, which is also conducive to reducing the weight of the entire optical path structure.

First Embodiment

The first embodiment provides an optical system, and the structure parameters in the optical system are shown in Table 1. FIG. 2 shows the structure of the optical system.

According to the above first embodiment, it can be seen that, the effective focal length $f_1$ of the first lens is 31.128 mm; the effective focal length $f_2$ of the second lens is 35.81 mm; the effective focal length $f_3$ of the third lens is −124.804 mm; the effective focal length f of the optical system is 19.248 mm.

The performance of the optical system according to the first embodiment of the present disclosure is demonstrated by the following parameters.

Figure 3:
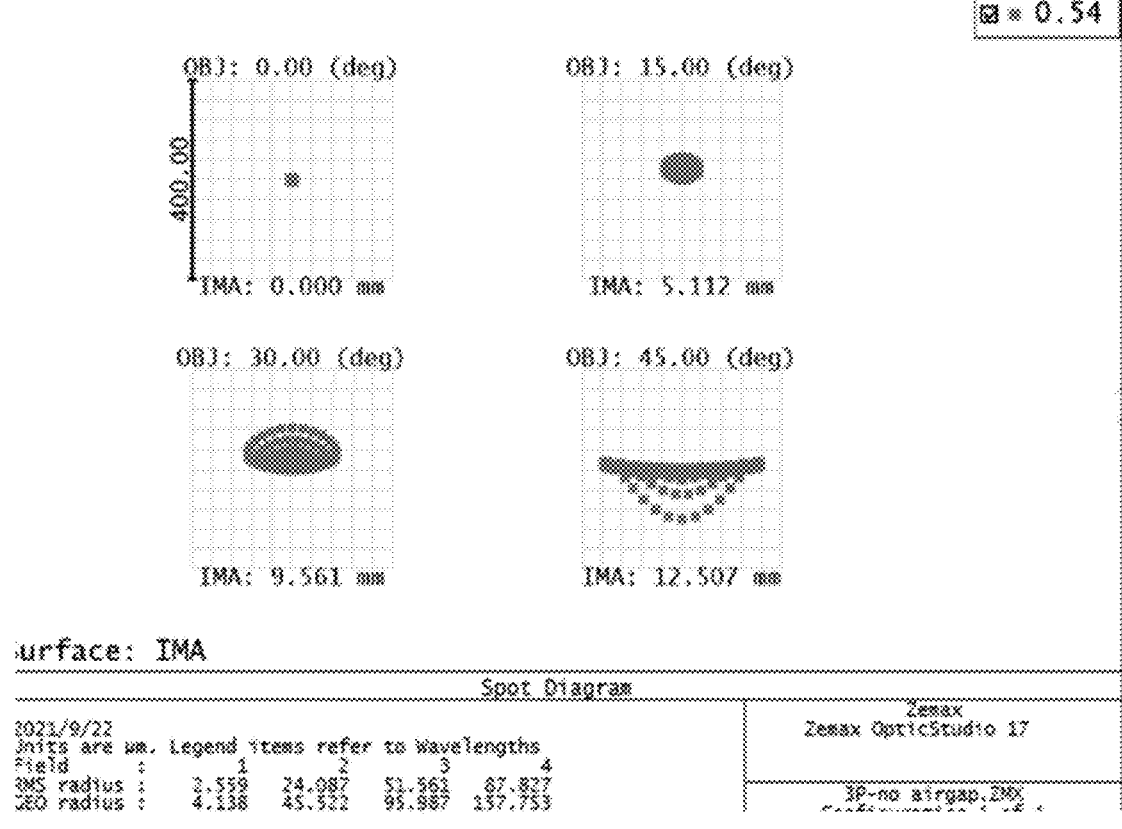
FIG. 3 is a spot diagram of an optical system according to the first embodiment of the present disclosure.

As shown in FIG. 3, the maximum spot size is at the position of the maximum field of view (1.0 F), and its maximum value is less than 88 μm.

Figure 4:
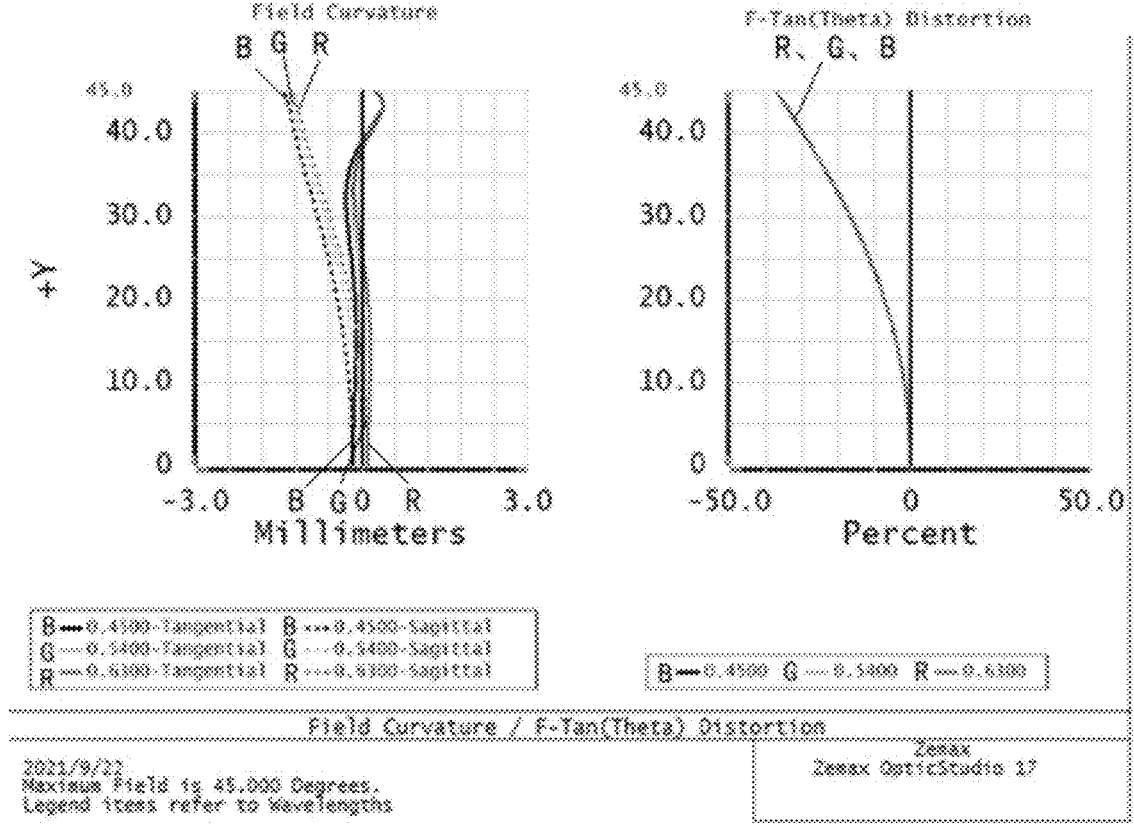
FIG. 4 is a field curvature and distortion diagram of an optical system according to the first embodiment of the present disclosure.

As shown in FIG. 4, the field curvatures of RGB in T and S directions are less than 1.5 mm, and the maximum distortion is at the position of the maximum field of view and is less than 37%.

Figure 5:
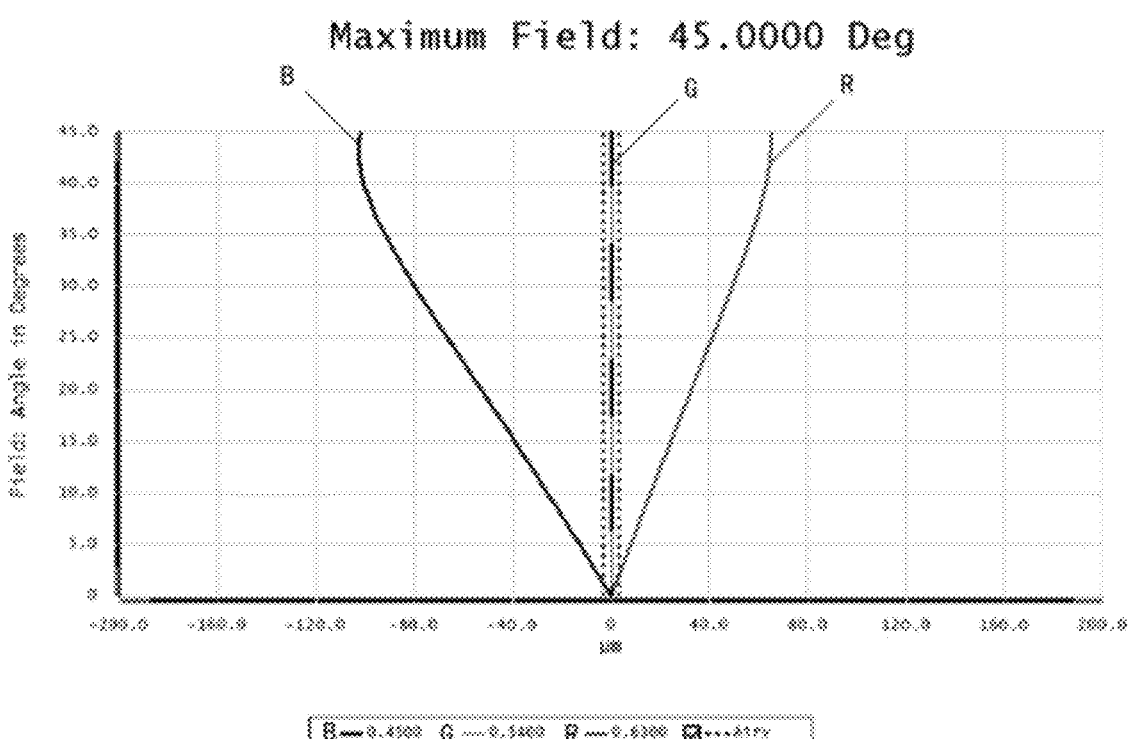
FIG. 5 is a dispersion diagram of an optical system according to the first embodiment of the present disclosure.

As shown in FIG. 5, the maximum dispersion of RGB is at the position of 0.9 F field of view, the whole RGB is 450 nm to 630 nm, and the LCA is 170 nm.

Second Embodiment

The second embodiment provides an optical system, and the structure parameters in the optical system are shown in Table 2. FIG. 6 shows the structure of the optical system.

TABLE 2

| Surf | Type | Radius | Thickness | GLASS | Clear Diam | Mech Diam | Conic | 4th | 6th |
|---|---|---|---|---|---|---|---|---|---|
| OBJ | STANDARD | Infinity | −1500 | | 3000 | 3000 | 0 | | |
| TO | STANDARD | Infinity | 12 | | 4 | 4 | 0 | | |
| 2 | EVENASPH | 47.028 | 3.000 | K26R | 32.06139 | 33.25 | −2.033 | −1.903E−06 | −4.766E−08 |
| 3 | FRESNELS | −26.000 | 0.100 | OCA | 33.25 | 33.25 | −4.522 | 2.267E−05 | −6.032E−08 |
| 4 | FRESNELS | 26.000 | 4.072 | K26R | 33.3437 | 33.3437 | −0.280 | 2.403E−05 | −1.379E−08 |
| 5 | EVENASPH | −56.147 | 0.200 | OCA | 32.90875 | 32.90875 | −3.455 | 1.158E−06 | −1.513E−08 |
| 6 | EVENASPH | −56.147 | 2.999 | OKP-1 | 32.65753 | 32.65753 | −3.455 | 1.158E−06 | −1.513E−08 |
| 7 | EVENASPH | −300.000 | 13.512 | | 31.956 | 32.65753 | 10.000 | | |
| 8 | STANDARD | Infinity | 0.450 | BK7 | 25.3329 | 25.34405 | 0 | | |
| 9 | STANDARD | Infinity | 0.098 | | 25.34405 | 25.34405 | 0 | | |
| IMA | STANDARD | Infinity | | | 25.14442 | 25.14442 | 0 | | |

According to the above second embodiment, it can be seen that, the effective focal length $f_1$ of the first lens is 31.59 mm; the effective focal length $f_2$ of the second lens is 33.63 mm; the effective focal length $f_3$ of the third lens is 106.77 mm; the effective focal length f of the optical system is 19.28 mm.

The performance of the optical system of the second embodiment of the present disclosure is demonstrated by the following parameters.

Figure 7:
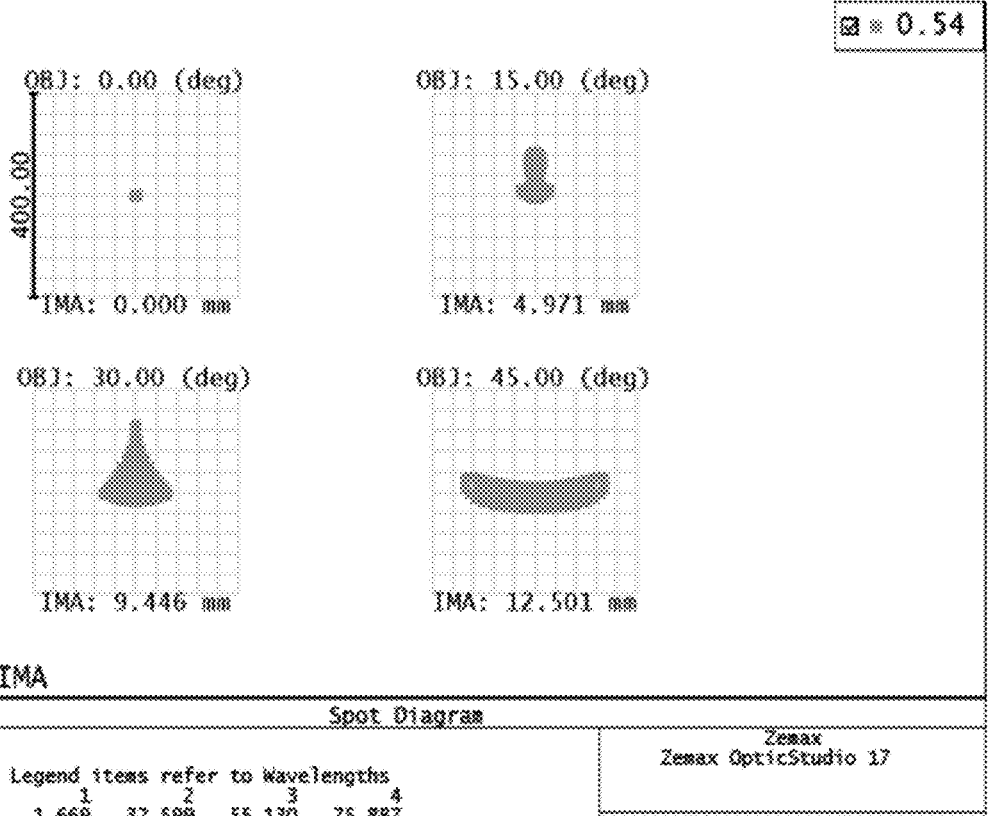
FIG. 7 is a spot diagram of an optical system according to the second embodiment of the present disclosure.

As shown in FIG. 7, the maximum spot size is at the position of the maximum field of view (1.0 F), and its maximum value is less than 76 μm.

Figure 8:
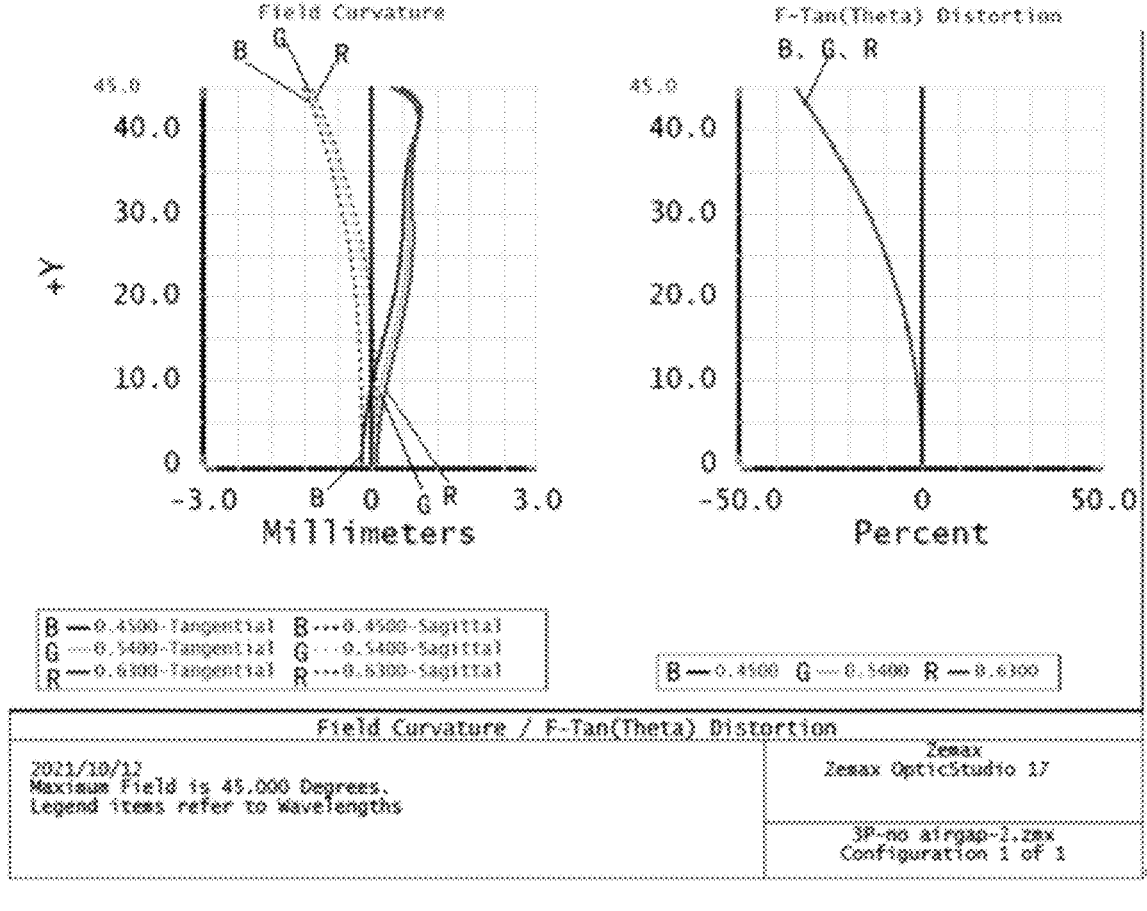
FIG. 8 is a field curvature and distortion diagram of an optical system according to the second embodiment of the present disclosure.

As shown in FIG. 8, the field curvatures of RGB in T and S directions are less than 1.2 mm, and the maximum distortion is at the position of the maximum field of view and is less than 35%.

Figure 9:
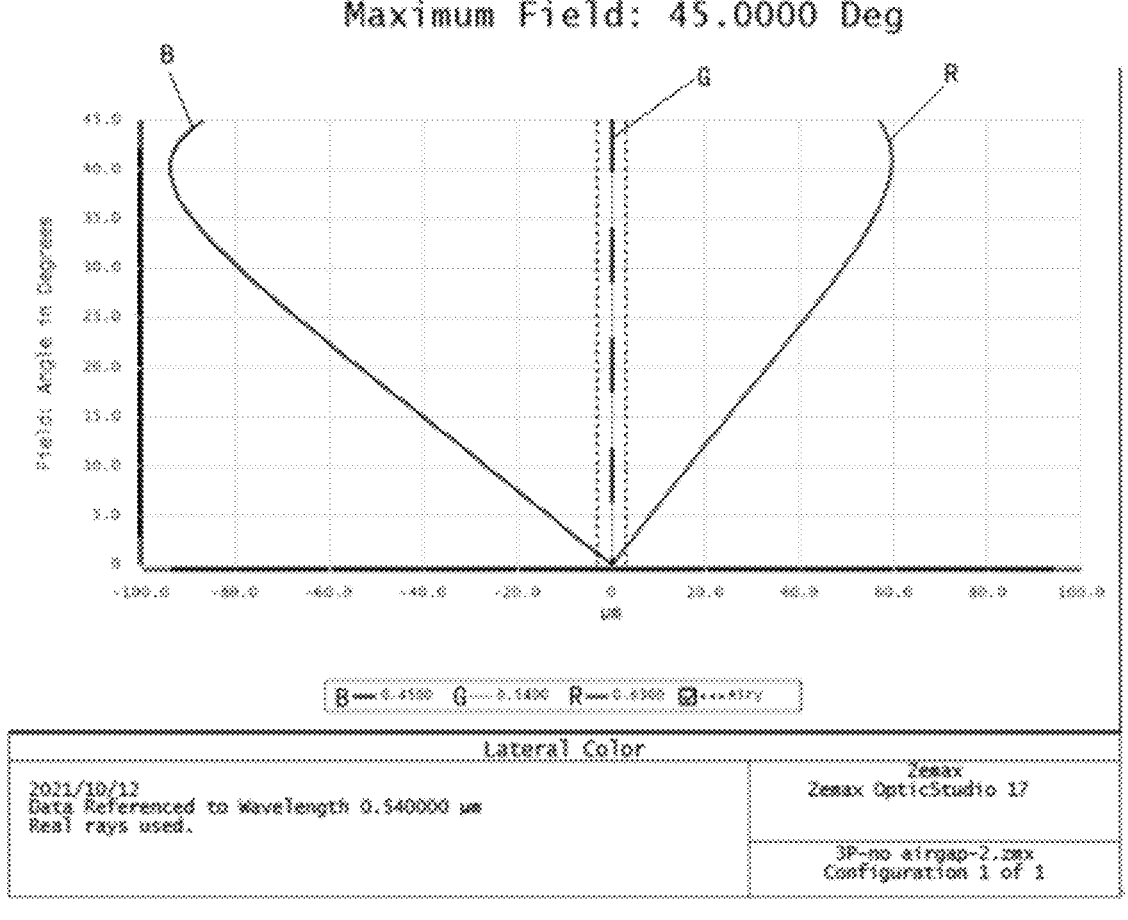
FIG. 9 is a dispersion diagram of an optical system according to the second embodiment of the present disclosure.

As shown in FIG. 9, the maximum dispersion of RGB is at the position of 0.9 F field of view, the whole RGB is 450 nm to 630 nm, and the LCA is 155 nm.

Third Embodiment

The third embodiment provides an optical system, and the structure parameters in the optical system are shown in Table 3. FIG. 10 shows the structure of the optical system.

the maximum distortion is at the position of the maximum field of view and is less than 34%.

Figure 13:
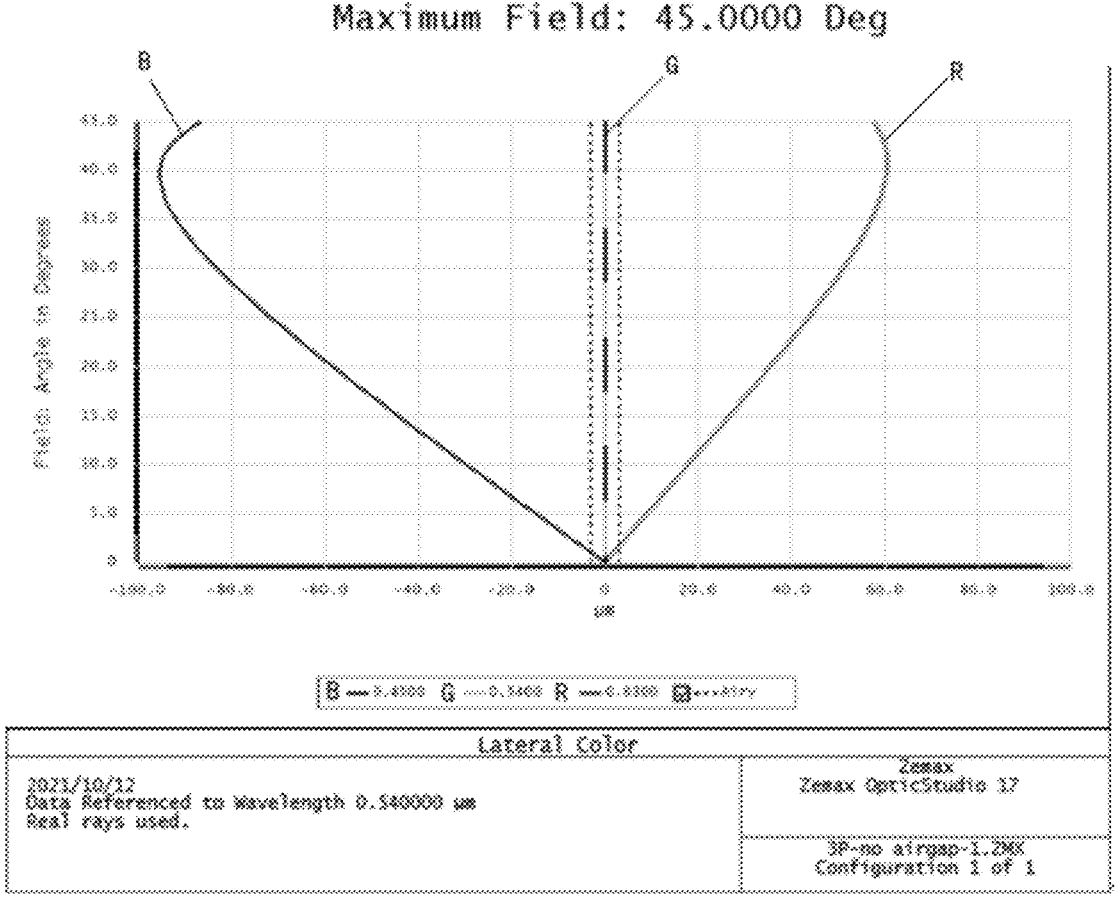
FIG. 13 is a dispersion diagram of an optical system according to the third embodiment of the present disclosure.

As shown in FIG. 13, the maximum dispersion of RGB wavelengths is at the position of the maximum field of view, the whole RGB is 450 nm to 630 nm, and the LCA is 155 nm.

Based on the above three examples, it can be seen that the first lens 1 and the second lens 2 provide positive focal powers, and the third lens 3 provides a negative focal power. The effective focal length of the first lens 1 and the second lens 2 is between 30 mm and 40 mm, the effective focal length f3 of the third lens 3 is between −100 mm and −180 mm, and the effective focal length f of the optical system obtained is between 19.0 mm and 19.5 mm.

The embodiments of the present disclosure provide a short-focus optical system, which does not involve a folded optical path.

(1) The glued lens group is formed by gluing three optical lenses, thereby achieving the ultra-short-focus effect. The glued lens group can be used as one optical component, which reduces the difficulty of assembly of optical components, reduces the risk of generating impurities between lenses during the assembly, and thus improves the yield.

TABLE 3

| Surf | Type | Radius | Thickness | GLASS | Clear Diam | Mech Diam | Conic | 4th | 6th |
|---|---|---|---|---|---|---|---|---|---|
| OBJ | STANDARD | Infinity | −1500 | | 3000 | 3000 | 0 | | |
| STO | STANDARD | Infinity | 12 | | 4 | 4 | 0 | | |
| 2 | EVENASPH | 45.000 | 3.000 | | 15.542 | 16.435 | −2.035 | −1.012E−06 | −7.790E−08 |
| 3 | FRESNELS | −26.000 | 0.100 | | 16.435 | 16.435 | −5.652 | 5.619E−06 | −8.426E−08 |
| 4 | FRESNELS | 26.000 | 3.966 | | 16.480 | 16.480 | −0.271 | 1.338E−05 | 8.537E−09 |
| 5 | EVENASPH | −86.540 | 0.200 | | 16.239 | 16.239 | 2.793 | −1.314E−05 | 8.232E−09 |
| 6 | EVENASPH | −86.540 | 2.999 | | 16.115 | 16.115 | 2.793 | −1.314E−05 | 8.232E−09 |
| 7 | EVENASPH | −414.959 | 13.361 | | 15.554 | 16.115 | −9.994 | 1.216E−08 | −2.055E−10 |
| 8 | STANDARD | Infinity | 0.450 | BK7 | 12.645 | 12.645 | 0 | | |
| 9 | STANDARD | Infinity | 0.100 | | 12.607 | 12.645 | 0 | | |
| IMA | STANDARD | Infinity | | | 12.510 | 12.510 | 0 | | |

According to the above third embodiment, it can be seen that, the effective focal length $f_1$ of the first lens is 31.1 mm; the effective focal length $f_2$ of the second lens is 37.65 mm; the effective focal length $f_3$ of the third lens is −168.8 mm; the effective focal length f of the optical system is 19.07 mm.

The performance of the optical system of the third embodiment of the present disclosure is demonstrated by the following parameters.

Figure 11:
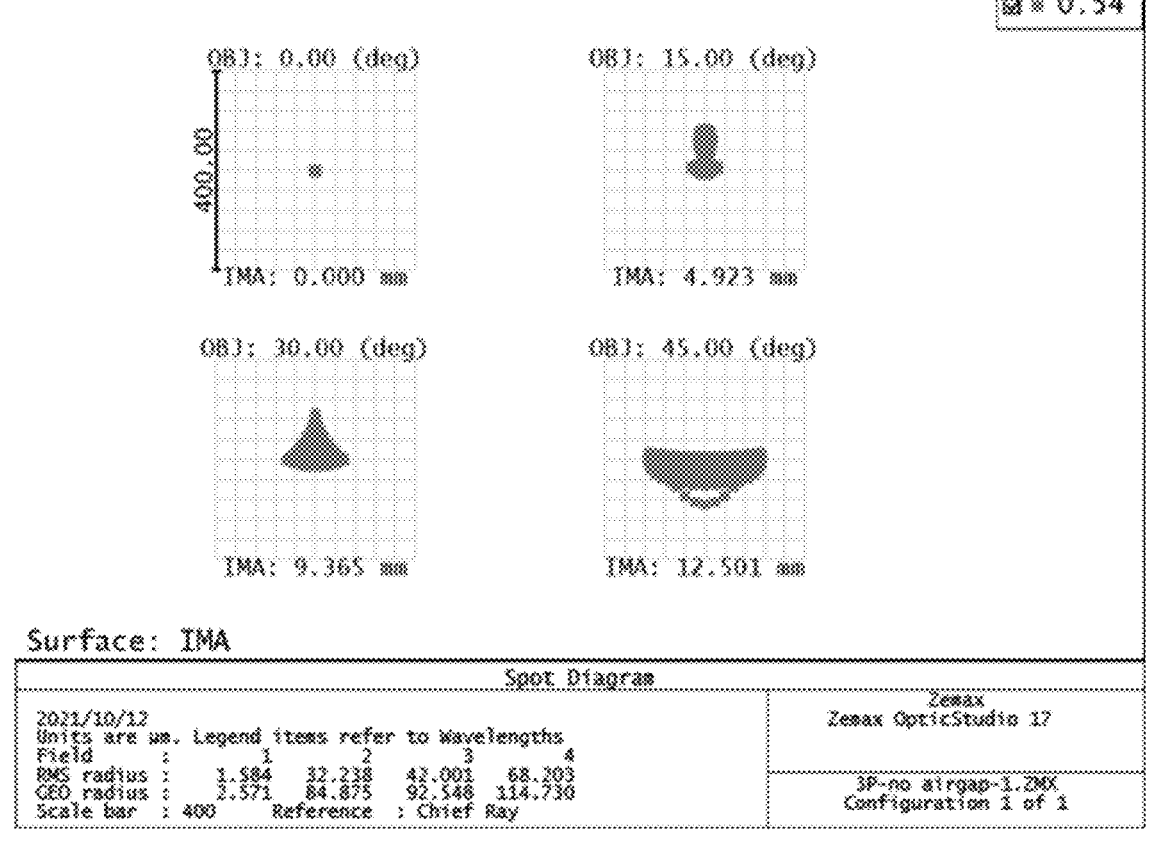
FIG. 11 is a spot diagram of an optical system according to the third embodiment of the present disclosure.

As shown in FIG. 11, the maximum spot size is at the position of the maximum field of view (1.0 F), and its maximum value is less than 70 μm.

Figure 12:
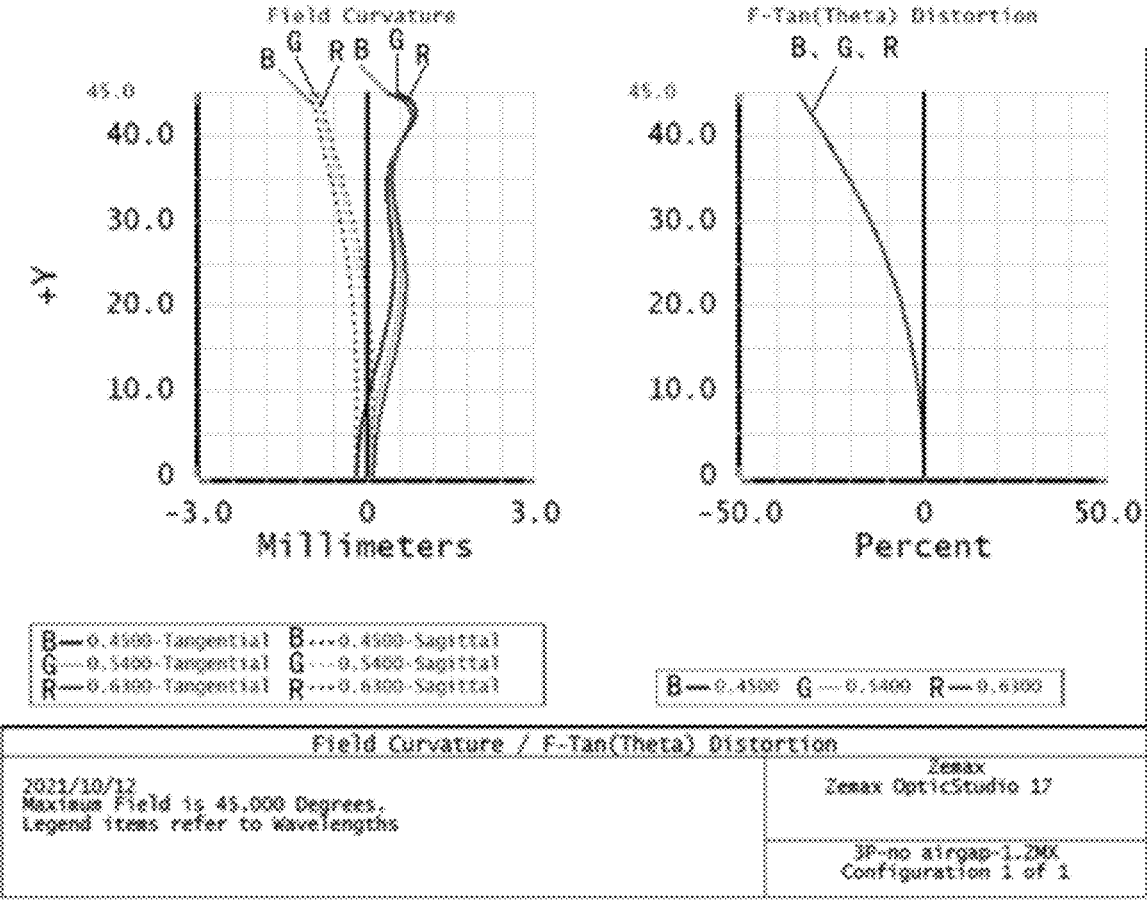
FIG. 12 is a field curvature and distortion diagram of an optical system according to the third embodiment of the present disclosure.

As shown in FIG. 12, the field curvatures of RGB wavelengths in T and S directions are less than 1.0 mm, and (2) Gluing two Fresnel surfaces and two aspherical surfaces can reduce stray light.

According to another aspect of the present disclosure, a head mounted display is provided.

The head mounted display comprises an optical system as described above.

The head mounted display is, for example, a VR device.

The description of the above embodiments focuses on the differences between various embodiments. As long as the different optimized features between the embodiments are not contradictory to each other, they can be combined to form a better embodiment, which will not be repeated herein for simplicity of the description.

Although some specific embodiments of the present disclosure have been described in detail by examples, those skilled in the art should understand that the above examples are only for illustration, not for limiting the scope of the present disclosure. Those skilled in the art should understand that the above embodiments can be modified without departing from the scope and spirit of the present disclosure. The scope of the present disclosure is defined by the appended claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An optical system, comprising:

a third lens (3), a second lens (2) and a first lens (1) glued successively along a propagation direction of incident light;

wherein two glued surfaces of the first lens (1) and the second lens (2) are Fresnel surfaces, wherein the first lens (1) and the second lens (2) both have positive focal powers, and the third lens (3) has a negative focal power.

2. The optical system according to claim 1, wherein an effective focal length f1 of the first lens (1) and an effective focal length f of the optical system satisfy $1.5 < f1/f < 2.22$;

an effective focal length f2 of the second lens (2) and the effective focal length f of the optical system satisfy $1.5 < f2/f < 2.22$; and an effective focal length f3 of the third lens (3) and the effective focal length f of the optical system meet $-9 < f3/f < -5$.

3. The optical system according to claim 1, wherein the effective focal length f1 of the first lens (1) is $30 \text{ mm} \leq f1 \leq 40 \text{ mm}$;

the effective focal length f2 of the second lens (2) is $30 \text{ mm} \leq f2 \leq 40 \text{ mm}$;

the effective focal length f3 of the third lens (3) is $-180 \text{ mm} \leq f3 \leq -100 \text{ mm}$; and the first lens (1), the second lens (2) and the third lens (3) are located on a same optical axis.

4. The optical system according to claim 1, wherein the effective focal length f of the optical system is $18 \text{ mm} \leq f \leq 20 \text{ mm}$.

5. The optical system according to claim 1, wherein the two glued Fresnel surfaces are glued and connected by means of edge gluing in edge areas.

6. The optical system according to claim 1, wherein the two glued surfaces of the second lens (2) and the third lens (3) are both aspherical surfaces.

7. The optical system according to claim 6, wherein the two glued aspherical surfaces are glued and connected in either of the following ways:

the two aspherical surfaces are glued and connected by means of edge gluing in edge areas;

the two aspherical surfaces are glued and connected by means of surface gluing.

8. The optical system according to claim 1, wherein a light-transmitting optical glue (6) is applied between the first lens (1) and the second lens (2), and between the second lens (2) and the third lens (3) respectively to glue them together, and a refractive index of the optical glue (6) is 1.1 to 1.3.

9. A head mounted display comprising the optical system according to claim 1.

10. A head mounted display comprising the optical system according to claim 2.

11. A head mounted display comprising the optical system according to claim 3.

12. A head mounted display comprising the optical system according to claim 4.

13. A head mounted display comprising the optical system according to claim 5.

14. A head mounted display comprising the optical system according to claim 6.

15. A head mounted display comprising the optical system according to claim 7.

16. A head mounted display comprising the optical system according to claim 8.

* * * * *